United States Patent
Venkatachary et al.

(10) Patent No.: US 7,978,709 B1
(45) Date of Patent: Jul. 12, 2011

(54) PACKET MATCHING METHOD AND SYSTEM

(75) Inventors: Srinivasan Venkatachary, Sunnyvale, CA (US); Pankaj Gupta, Mountain View, CA (US)

(73) Assignee: NetLogic Microsystems, Inc., Santa Clara, CA (US)

( * ) Notice: Subject to any disclaimer, the term of this patent is extended or adjusted under 35 U.S.C. 154(b) by 539 days.

(21) Appl. No.: 12/165,541

(22) Filed: Jun. 30, 2008

Related U.S. Application Data

(62) Division of application No. 09/992,677, filed on Nov. 14, 2001, now abandoned.

(60) Provisional application No. 60/249,701, filed on Nov. 16, 2000.

(51) Int. Cl.
*H04L 12/28* (2006.01)

(52) U.S. Cl. .................. 370/395.32; 370/412; 370/428

(58) Field of Classification Search .............. 370/392, 370/395.31, 395.32, 412–418, 428–429; 707/2, 6
See application file for complete search history.

(56) References Cited

U.S. PATENT DOCUMENTS

| | | | |
|---|---|---|---|
| 5,574,910 A * | 11/1996 | Bialkowski et al. | ... 707/999.001 |
| 5,991,758 A * | 11/1999 | Ellard | .............. 709/206 |
| 6,018,524 A * | 1/2000 | Turner et al. | .................. 370/392 |
| 6,154,384 A | 11/2000 | Nataraj et al. | |
| 6,192,051 B1 | 2/2001 | Lipman et al. | |
| 6,212,184 B1 * | 4/2001 | Venkatachary et al. | ...... 370/392 |
| 6,215,816 B1 | 4/2001 | Gillespie et al. | |
| 6,223,172 B1 | 4/2001 | Hunter et al. | |
| 6,298,340 B1 * | 10/2001 | Calvignac et al. | ..... 707/999.001 |
| 6,307,855 B1 | 10/2001 | Hariguchi | |
| 6,374,326 B1 | 4/2002 | Kansal et al. | |
| 6,385,649 B1 | 5/2002 | Draves et al. | |
| 6,546,391 B1 | 4/2003 | Tsuruoka | |
| 6,571,313 B1 | 5/2003 | Filippi et al. | |
| 6,615,210 B1 * | 9/2003 | Huang et al. | ........... 707/999.006 |
| 6,662,184 B1 * | 12/2003 | Friedberg | ..................... 707/754 |
| 6,735,600 B1 | 5/2004 | Andreev et al. | |
| 6,778,984 B1 * | 8/2004 | Lu et al. | ................. 707/999.003 |
| 6,963,924 B1 | 11/2005 | Huang et al. | |
| 7,162,481 B2 | 1/2007 | Richardson et al. | |
| 7,249,228 B1 | 7/2007 | Agarwal et al. | |
| 7,266,085 B2 | 9/2007 | Stine | |
| 7,299,399 B2 | 11/2007 | Huang | |
| 7,313,666 B1 | 12/2007 | Saminda De Silva et al. | |
| 7,426,518 B2 | 9/2008 | Venkatachary et al. | ...... 707/100 |
| 7,461,200 B1 | 12/2008 | Birman et al. | ................. 711/108 |
| 7,571,156 B1 | 8/2009 | Gupta et al. | ...................... 707/3 |

(Continued)

OTHER PUBLICATIONS

A Fast and Scalable IP Lookup Scheme for High-Speed Networks, Chen et al., © 1999 IEEE, pp. 211-218.

(Continued)

*Primary Examiner* — Ricky Ngo
*Assistant Examiner* — Phuongchau B Nguyen
(74) *Attorney, Agent, or Firm* — Mahamedi Paradice Kreisman LLP; William L. Paradice, III

(57) ABSTRACT

A method of constructing a hierarchical database from an initial plurality of rules. A first rule of the initial plurality of rules is added to: a first sub-database if a first bit of the rule is a logic '0' value; a second sub-database if the first bit is a logic '1' value; or a third sub-database if the first bit is in a masked state, 'X', indicating that the first bit may be either a logic '1' or a logic '0' value.

15 Claims, 4 Drawing Sheets

U.S. PATENT DOCUMENTS

| | | | |
|---|---|---|---|
| 7,694,068 B1 | 4/2010 | Rosman | 711/108 |
| 7,836,246 B2 | 11/2010 | Birman et al. | 711/108 |
| 2002/0089937 A1 | 7/2002 | Venkatachary et al. | |
| 2008/0275872 A1* | 11/2008 | Venkatachary et al. | 707/5 |

OTHER PUBLICATIONS

Efficient hardware Architecture for Fast IP Address Lokup, Pao et al., IEEE INFOCOM 2002, pp. 555-561.

Fast Address lookups using controlled Prefix Expansion, Venkatachary Srinivasan et al., ACM Transactions on Computer Systems, vol. 17., No. 1, Feb. 1999, pp. 1-40.

Fast and Scalable Layer 4 Switching, V. Srinivasan, G Varghese, S. Suri and M. Waldvogel, Presented at ACM Sigcomm '98, 18 page slide presentation.

Forwarding Engine for Fast Routing Lookups and Updates, Yu et al., 1999 Gobal Telecommunications Conference, pp. 1556-1564.

Gupta, "Algorithms for routing Lookups and packet Classification," Dec. 2000, pp. 1-197.

Lampson et al., "IP Lookup using Multiway and Multicolumn Search," Aug. 1997, pp. 1-23.

Packet Classification using hierarchical Intelligent Cuttings, Pankaj Gupta and Nick McKeown, Proc. Hot Interconnects VII, Aug. 1999, Stanford University.

Packet Classification on Multiple Fields, Pankj Gupta and Nick McKeown, Proc. Sigcomm, Computer Communication Review, vol. 29, No. 4, pp. 147-160, Sep. 1999 Harvard University.

Reconfigurable memory Architecture for Scalable IP Forwarding Engines, Akhbarizadeh et al., © 2002 IEEE, pp. 432-437.

* cited by examiner

PACKET MATCHING METHOD AND SYSTEM

CROSS-REFERENCE TO RELATED APPLICATIONS

This application is a division of U.S. patent application Ser. No. 09/992,677 filed Nov. 14, 2001 now abandoned, entitled "Packet Matching Method and System," which claims priority from U.S. Provisional Application No. 60/249,701 filed Nov. 16, 2000, both of which are hereby incorporated by reference in their entireties.

BACKGROUND

Packet matching, which includes classification and forwarding, is a crucial function performed by Internet routers. Briefly, packet matching is concerned with the task of taking incoming packets to a router and determining how best to classify and how best to forward the packet based on the packet's header. Matching is generally accomplished the same way, namely the packet header is compared with a database, and the best match between the packet header and the entries of the database is found. The entries of the database may be classification rules, or they may be forwarding addresses, but the general procedure is the same. Furthermore, the goals of classification and forwarding are the same, that is finding the best match between the packet header and the database entries as quickly as possible.

In current routers, the databases, such as rule databases, contain anywhere from tens to around one thousand rules. These rules generally reside in high speed, solid state memory such as Content Addressable Memory (CAM) that allows quick, parallel, comparisons between an incoming packet and the contents of the memory. Today's most advanced routers can match up to around 10 million packets per second. While current solutions works well for rule databases of up to around one thousand rules, the current solutions do not scale up adequately for the requirements of next generation routers.

Next generation routers will maintain rule databases containing 32,000 or more rules. The increased speed of these new routers will require packet matching speeds of 100 million or more packets per second. Power dissipation becomes a major problem at these speeds. A parallel search of the databases requires that every bit of the memories upon which the databases reside be simultaneously accessed. This places excessive demands on the router's power distribution system, greatly complicating the layout and routing of the memory chips and printed circuit boards comprising the router, and significantly taxing the cooling systems employed by the router. Any conventional solutions to these problems adversely impact the cost of the router. While a more linear search can be performed on the databases, any reduction in parallelism adversely impacts the router's speed, which is limited by the packet matching speed.

Thus a need presently exists for a Packet Matching System and Method that can satisfy the packet matching needs of future routers while avoiding the limitations of present matching schemes.

SUMMARY

By way of introduction, the preferred embodiments described below provide a Packet Matching Method and System. The Packet Matching System comprises an All Matching Rules Engine, a plurality of Best Matching Rules Sub-Engines, and a Collate Engine. The All Matching Rules Engine receives a packet header and searches for at least one match for the packet header from among a set of Necessary. Path Condition Rules. The Necessary Path Condition Rules correspond to sub-databases comprising subsets of classification rules or forwarding entries. The Best Matching Rules sub-Engines comprise searchable memory such as Content Addressable Memory. The searchable memory stores the sub-databases. The Best Matching Rules sub-Engines search only those sub-databases corresponding to Necessary Path Condition Rules that match the packet header. Because the sub-databases are much smaller than the aggregation of all of the classification rules or forwarding entries, searching the memory of the sub-engines requires much less power than performing a search on all of the classification rules. At the same time the speed advantages of parallel searching is preserved. The Collate Engine selects the single highest priority rule from the best matching rules indicated by the Best Matching Rules sub-Engines. If there is no best matching rule for the packet header the Collate Engine outputs a default value.

The Necessary Path Condition Rules and sub-databases are extracted from a Hierarchical Subdivision Tree. The tree is constructed from the rule database through a recursive method that subdivides the entries of the database according to the bit values of each bit in each entry of the database. The subdivision results in a tree comprising a root, a plurality of nodes, and a plurality of leaves, wherein the root, the nodes, and the leaves are interconnected by a plurality of branches. Each branch corresponds to a value of the bits of each of the entries of the rule database. Each leaf comprises a sub-database. Each Necessary Path Condition Rule corresponds to at least one sub-database. Each Necessary Path Condition Rule is comprised of the bit values associated with each traversed branch of the hierarchical subdivision tree while traversing the hierarchical subdivision tree from the root to the corresponding sub-database. Rules may be inserted or deleted into the Hierarchical Subdivision Tree and the minimum and maximum number of rules per sub-database may be defined. The Hierarchical Subdivision Tree may be constructed for other types of databases such as Forwarding Address Databases.

The foregoing paragraphs have been provided by way of general introduction, and they should not be used to narrow the scope of the following claims. The preferred embodiments will now be described with reference to the attached drawings.

DETAILED DESCRIPTION OF THE PRESENTLY PREFERRED EMBODIMENTS

Figure 1:
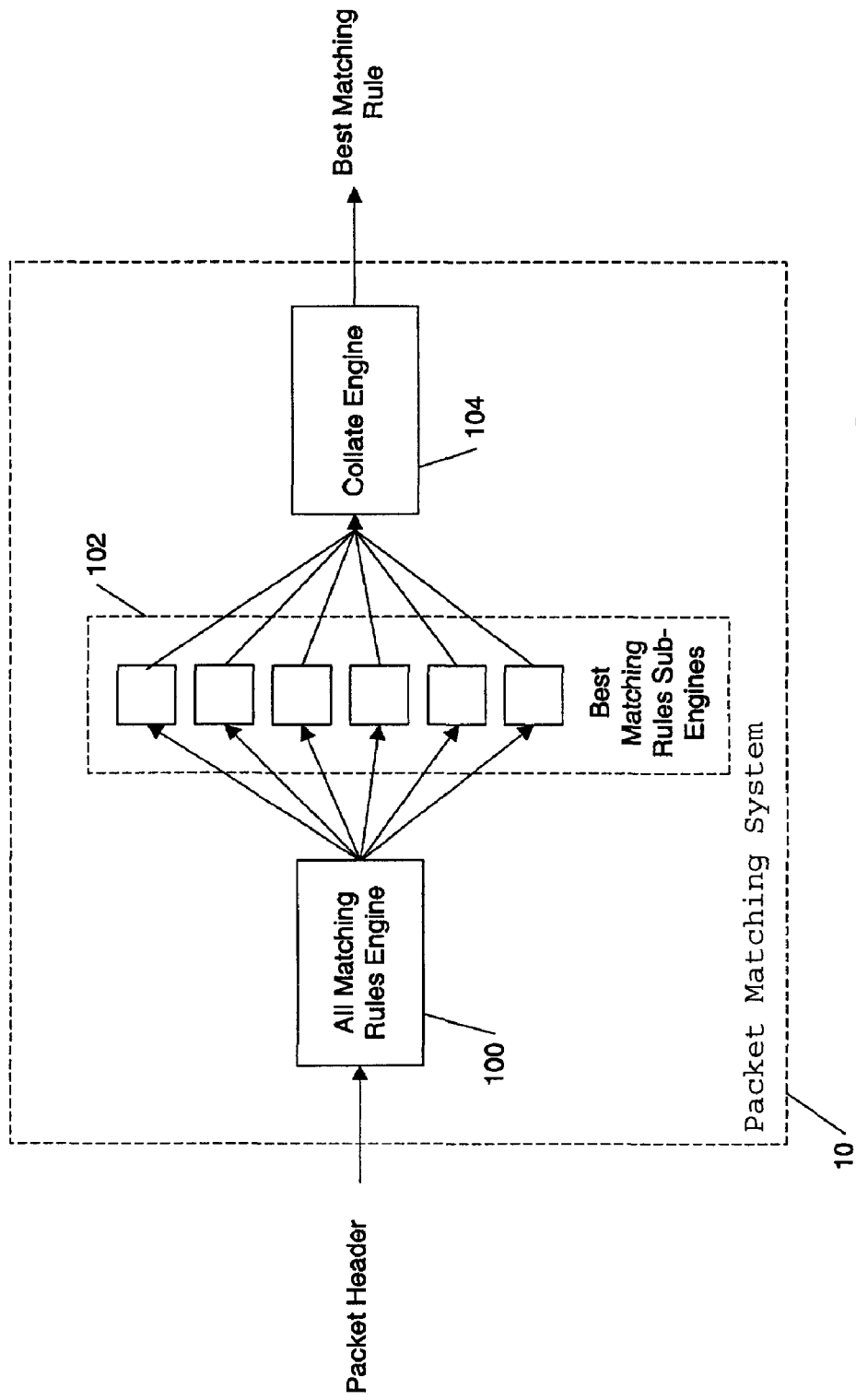
FIG. 1 is a block diagram of a the Packet Matching System of the present invention.

Turning now to the drawings, FIG. 1 illustrates a preferred embodiment of the Packet Matching System 10 of the present invention. The Packet Matching System accepts as input a packet header and produces as an output a best matching rule. If there is no best matching rule for a packet header, the Packet Matching System 10 outputs a default value.

As used herein, the term "matching rule" is intended broadly to encompass matching classification rules as well as matching forwarding entries. Furthermore the terms "classification rules", "forwarding entries", and "matching rules" are herein referred to interchangeably. For example, when referring to classification rules, it is also understood that a reference is being made to forwarding entries. Additionally the term "rules" is intended broadly to encompass classification rules as well as forwarding entries.

The Packet Matching System 10 comprises an All Matching Rules Engine (AMRE) 100, a plurality of Best Matching Rules sub-Engines (BMRSE) 102, and a Collate Engine 104. The AMRE 100 takes as input a packet header and compares the packet header to a set of Necessary Path Condition Rules (NPCR). Necessary Path Condition Rules will be discussed in detail below. The result of the comparison defines a subset of classification rules to be searched in order to find a best matching rule. Subsets of matching rules are grouped together as sub-databases. Sub-databases will be discussed in detail below.

Each of the BMRSE 102 comprise at least one sub-database. Each of the sub-databases comprising the BMRSE 102 corresponds to a Necessary Path Condition Rule of the AMRE 100. Thus, only sub-databases corresponding to Necessary Path Condition Rules that match with the incoming packet header are searched for a best matching rule. Furthermore each sub-database contains only a fractional subset of the entire database.

The Collate Engine 104 selects a single best matching rule from the outputs of the Best Matching Rules sub-Engines 102. Generally, if more than one BMRSE produces a best matching rule, the Collate Engine 104 simply chooses the best matching rule with the highest priority. All classification rules have a priority associated with them. Otherwise, if only one BMRSE produces a best matching rule, that rule alone is indicated by the Collate Engine 104 as the best matching rule. Selecting a rule based on it's priority is analogous to finding the highest priority element in a set. One preferred method implemented by the present invention to prioritize the classification rules is to organize the entries in the sub-databases in the Best Matching Rules sub-Engines 102 according to their cost. Those rules with the lowest cost will be considered to have a higher priority than those with a higher cost. The Collate Engine 204 then selects the highest priority rule of the set of all best matching rules. The practice and implementation of such searches are well understood by those skilled in the art. Assigning priorities is a common task performed by system administrators. For prefix matching, longer matching prefixes have a higher priority than shorter matching prefixes.

The physical implementation of the AMRE 100 and the BMRE 102 requires the ability to store and quickly search the Necessary Path Condition Rules of the AMRE 100 and the sub-databases of the BMRE 102. Any storage medium capable of storing data structures for rule matching and efficiently searching rules may be used for storage and searching of the Necessary Path Condition Rules and sub-databases. Preferably, the AMRE 100 and each Best Matching Rules sub-Engine 102 comprise a Content Addressable Memory (CAM). CAMs allow the quick storage and parallel search and retrieval of their memory contents and are well understood by those skilled in the art. Alternatively the AMRE 100 and Best Matching Rules sub-Engines 102 may comprise various memory technologies such as DRAM and SRAM. Additionally, these and other storage and search technologies may be used alone or in combination. It is advantageous to reduce the number of memories, or memory elements, searched per incoming packet. The greater the size of the search the greater the power requirements of this, or any, classification system.

During a best matching rule search for a packet header the entire contents of the AMRE CAM is searched. This occurs for each and every incoming packet. The CAM however need only be able to store a small fraction of bits in comparison to the total number of bits comprising all of the classification rules. This is because, as will detailed below, the number of Necessary Path Condition Rules is a fraction of the number of classification rules.

Thus, providing a database of classification rules and the method described below to create a plurality of sub-databases of classification rules, the Necessary Path Condition Rules comprising the memory contents of the AMRE memory are searched against the packet header to determine which sub-databases to search.

Once it is determined which databases to search, only the Best Matching Rules sub-Engines comprising the databases determined to be searched participate in searching for the best matching rule. Thus, whereby in the prior art, at best, reduces the number of rules that must be searched on average for each and every packet classification to around 50% of the total number of rules, the present invention typically performs a hierarchical search on only a very small fraction of the plurality of classification rules thereby significantly reducing the power requirements of the entire search. Additionally, all searching is done in parallel thereby retaining the same speed advantages of the searching methods of the prior art. Occasionally, there might be some packets for which all of the BMRSE must participate in the search, however this is statistically quite rare and even with these full searches large power savings are realized on average. As a result the present invention yields a power savings of at least around 90% on average over the prior art.

Finally, once the best matching rules are found, the Collate Engine 104 is used to select the best matching rule as described above.

As previously mentioned, each BMRSE comprises a searchable memory such as a CAM and each CAM comprises at least one sub-database. Due to the granularity of the CAM, more than one sub-database typically resides on each BMRSE CAM.

Also, as is well understood by those skilled in the art, the memory technologies discussed above may be physically separate memories residing on separate chips, they may be separate chips integrated within a single package, they may be separate memories residing on the same semiconductor chip, or they may manifest themselves as logically separate memories while residing physically on the same memory. Many other memory implementations and architectures may be used and such memories and architectures are well understood by those skilled in the art. The key requirement among all of these implementations however is that a subset of all of the memory contents may be searched while not searching the remaining contents.

Organizing the Rule Database

A method to organize the plurality of classification rules comprising the rule database will now be discussed. The method involves the creation of a Hierarchical Subdivision Tree (HST). The HST is created via a recursive algorithm that works on the bits or the classification rules and stops when either all of the bits have been examined or the rules have been divided into sufficiently small sub-rule sets, or sub-databases. The HST comprises a single root marking the start of the tree, a plurality of nodes, and a plurality of leaves. The root, nodes and leaves are interconnected by a plurality of branches. As will be shown, each branch corresponds to a bit value of the bits comprising the plurality of classification rules. The leaves correspond to endpoints of the HST, and as will be shown, the contents of the leaves comprise the sub-databases. The nodes provide intersection points for the branches.

In the presently preferred embodiment, there is one unique path from the root of the HST, through the nodes, via the branches, to each leaf. While traversing each path, the bits corresponding to each branch traversed comprises the bits in each Necessary Path Condition Rule of the plurality of Necessary Path Condition Rules that comprise the AMRE 100.

Figures 2A, 2B:
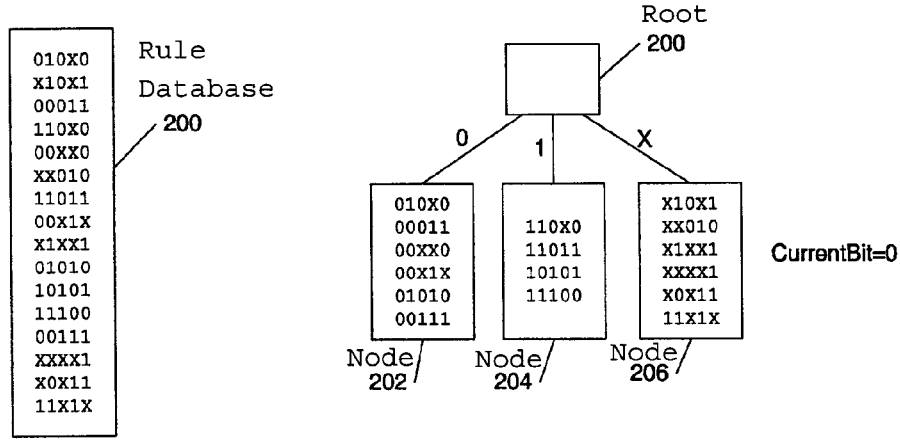
FIGS. 2a-d illustrates a method of a preferred embodiment for organizing a rule database through the construction of a hierarchical subdivision tree.

Turning now to FIGS. 2a-d the construction of an exemplary hierarchical subdivision tree is described. FIG. 2a shows a rule database 200 comprising N=16 rules, each rule comprising W=5 bits, wherein each bit has a value of "0", "1" or "X". In practice there may be tens of thousand of rules in the rule database, and each rule may have hundreds of bits. A larger sub-database will result in a larger HST with more nodes, branches, and leaves, but the steps to create the HST are identical. Prior to building the HST a threshold is set. In this example the threshold is T=3. The threshold defines the maximum number of rules per sub-database.

In FIG. 2b three nodes 202, 204, 206 connected by three branches labeled '0', '1', and 'X' are created. This level is the CurrentBit=0 level meaning that any nodes created are the result of examining the first bit (bit 0) of every rule F in the rule database 200. Rules where bit 0 equals zero, that is F(CurrentBit)='0', comprise the node connected via the branch '0'. Rules where bit 0 equals '1', that is F(CurrentBit)='1', comprise the node connected via the branch '1'. And rules where bit 0 equals 'X', that is R(CurrentBit)='X' comprise the node connected via the branch 'X'.

Thus, FIG. 2b shows three nodes: node 202 comprising six rules, all of which F(CurrentBit=0) equals '0', node 204 comprising four rules, all of which F(CurrentBit=0) equals '1', and node 206 comprising six rules, all of which F(CurrentBit=0) equal 'X.' Accordingly, node 202 is connected to it's parent 200, also the root, via a '0' branch, node 204 is connected to it's parent 200 via a '1' branch, and node 206 is connected to it's parent 200 via an 'X' branch.

It is noted from FIG. 2b that each ending node 202, 204 and 206 has more than T=3 rules. Since T=3 represents the maximum number of rules per sub-database, and as it stands in FIG. 2b, each ending node has more than three rules, the HST must be further divided into additional nodes to reduce the number of rules per ending node.

Figure 2C:
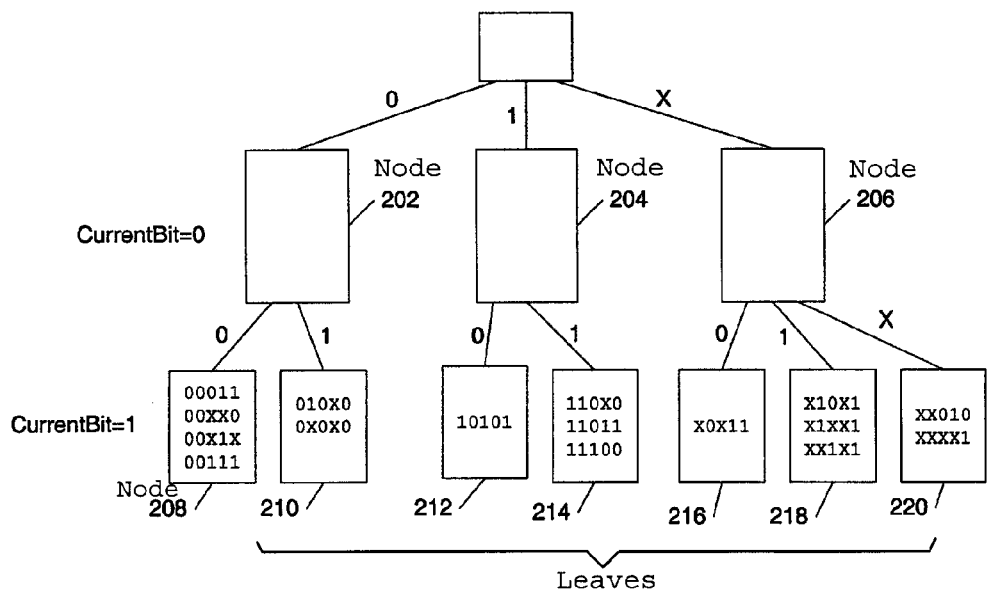

FIG. 2c shows the evolution of the HST for the second bit of the classification rules, F(CurrentBit=1). Each of the nodes 202, 204 and 206 can spawn up to three additional nodes connected by branches denoted '0', '1', or 'X'. Examining node 202 of FIG. 2b it is noted that the second bit of each rule is either a '0' or a '1'. Accordingly, nodes 208 and 210 are created. Node 208, connected by a '0' branch comprises four rules, each of which has F(CurrentBit=1)='0'. Node 210 comprises two rules connected by branch '1', each rule obeying F(CurrentBit=1)='1'. Similarly, nodes 212 and 214 are created from their parent node 204. And nodes 216, 218 and 220 are created from their parent node 206. Note that node 206 spawns three children connected by branches '0', '1', and 'X' since F(CurrentBit=1) have all three values.

Next, upon examining nodes 208-220 of FIG. 2c it is noted that node 208 comprises four rules. Since T=3, and 4>3, node 208 must be subdivided once again. Nodes 210-220 all have less than or equal to three rules. Therefore no more subdivision is necessary and nodes 210-220 can be considered leaves, and their contents sub-databases.

Figure 2D:
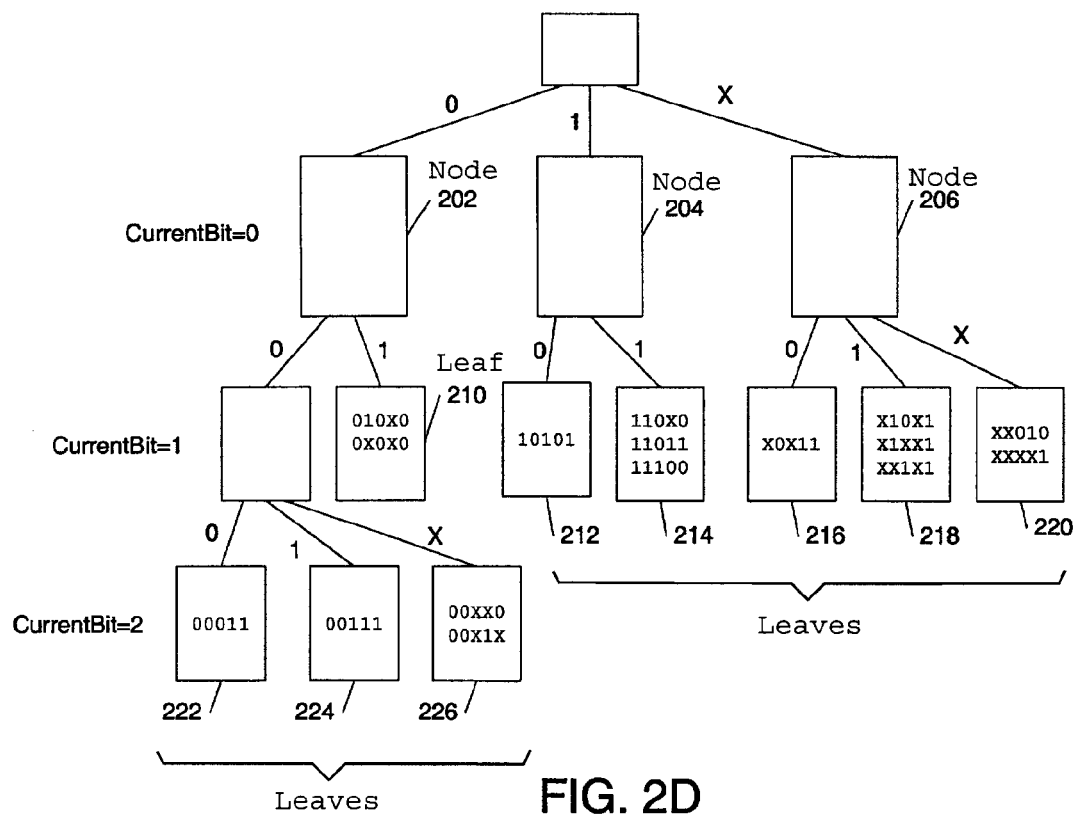

FIG. 2d illustrates yet another recursive pass in the formation of the HST. Here only node 208 is operated upon to create nodes 222, 224 and 226 connected to their parent node 208 via branches '0', '1', and 'X' respectively. As can be seen, the comparison of F(CurrentBit=2) for the rules in node 208 yields rule subsets comprising less than or equal to T=3 rules. Thus, all of the rules of the original rule database 200 have been sub-divided into sub-databases, the contents of which are found in leaves 222-226, 212-220, of less than or equal to T=3 rules and a complete HST has been created via the recursive algorithm.

In summary, the recursive algorithm used to create the HST comprises the following steps:

1) Providing a rule database comprising a plurality of rules F each of length W bits, let T=maximum number of rules per sub-database;
2) CurrentBit=0;
3) Subdivide the rule database into sub-rule sets according to F(CurrentBit)
4) For each sub-rule set:
  a) if the number of rules F in each sub-rule set ≦T, then the sub-rule set is a sub-database and no more operations should be performed on the sub-rule set, else
  b) CurrentBit=CurrentBit+1, subdivide each sub-rule set comprising a number of rules F>T into additional sub-rule sets according to F(CurrentBit), and repeat step 4 until step 4a is satisfied for all sub-rule sets, or all bits F(CurrentBit=W) have been examined.

The Necessary Path Condition Rules are extracted from the HST by traversing a path from the root of the HST to each leaf of the HST and noting the value of each branch traversed. The Necessary Path Condition Rules comprise all of the values of the each traversed branch plus don't care bits, 'X', in order to ensure that the number of bits of the Necessary Path Condition Rules equal the number of bits of the rules.

Turning to FIG. 2d, there are eight leafs, representing eight sub-databases, and thus there are eight Necessary Path Condition Rules. Thus, the NPCR for the database of leaf 224 is "001XX" since branch '0' between root 200 and node 202 is traversed, branch '0' between nodes 202 and 208 is traversed, and branch '1' between node 208 and leaf 224 is traversed. The Necessary Path Condition Rules for the exemplary database of FIG. 2a are thus shown in Table 1 below.

TABLE 1

| NPCR | Corresponding Sub-Database (See annotations on FIG. 2d) | Rules in sub-database |
|---|---|---|
| 000XX | 222 | 00011 |
| 001XX | 224 | 00111 |
| 00XXX | 226 | 00XX0 |
|  |  | 00X1X |
| 10XXX | 212 | 10101 |
| 11XXX | 214 | 110X0 |
|  |  | 11011 |
|  |  | 11100 |
| X0XXX | 216 | X0X11 |
| X1XXX | 218 | X10X1 |
|  |  | X1XX1 |
|  |  | XX1X1 |
| XXXXX | 220 | XX010 |
|  |  | XXXX1 |

It is noted then that in constructing the HST, each sub-database comprises a set of up to T classification rules, and each classification rule is a member of exactly one sub-database.

Reducing the Number of Sub-Databases and NPCR

The number of NPCR entries in the All Matching Rules Engine can be reduced, along with the number of sub-rule databases, via a rule merging technique called Rule Subset Hoisting. Through Rule Subset Hoisting, subsets of rules comprising a sub-database having less than a number $T_{min}$ of rules are merged to create a new sub-database having greater than $T_{min}$ rules but less than T rules.

Figure 3A:
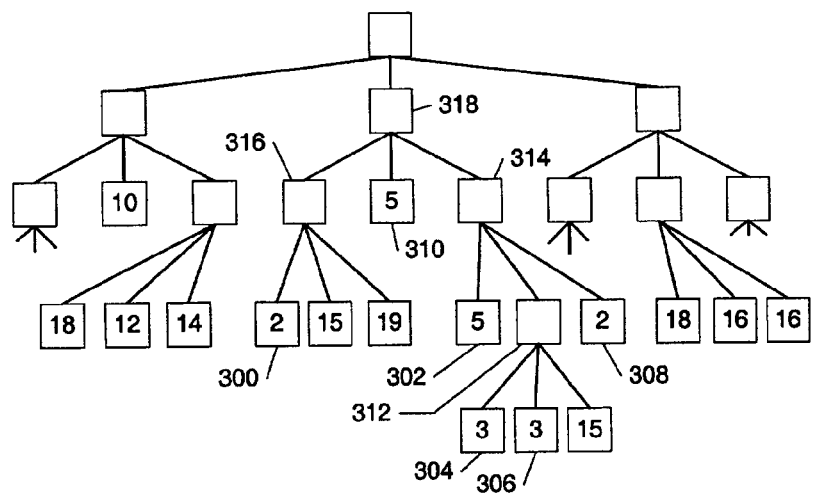
FIGS. 3a-b illustrates a method of a preferred embodiment for reducing a plurality of sub-databases in a hierarchical subdivision tree.
Figure 3B:
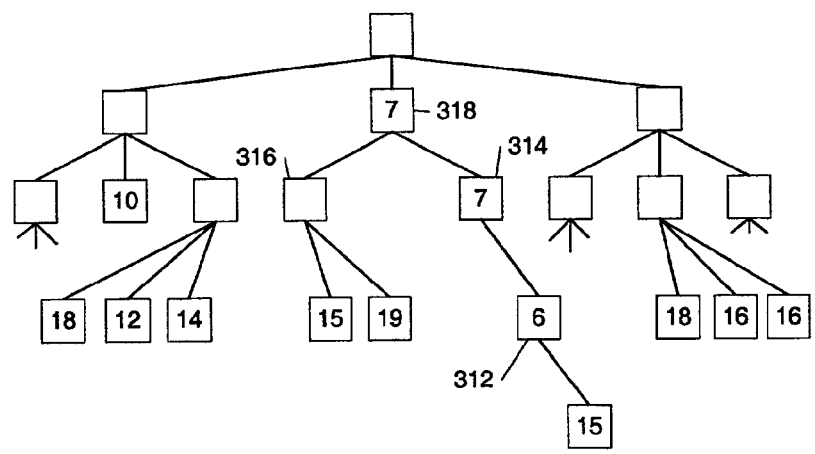

FIGS. 3a-b illustrates the Rule Subset Hoisting method. The exact number of rules, their bit lengths, the number of nodes, leaves, branches and the like, along with the number of iterations of the recursive HST algorithm required to complete the HST of FIG. 3a is unimportant to this example.

FIG. 3a shows a section of an HST with sixteen leaves shown. The leaves contain a number indicating the number of rules per leaf, or sub-database. The root and the nodes contain no number. In this example, T=20 and $T_{min}$=T/3=6. As such, all leaves contain less than or equal to T=20 rules.

Looking closely at FIG. 3a it is seen that leaves 300, 302, 304, 306, 308, and 310 comprise 2, 5, 3, 3, 2, and 5 rules per sub-database, respectively. As was already noted, $T_{min}$=6 so these rules are all below the minimum number defined for this HST.

These rules are "hoisted" up to their parents. For example, sub-rule set 300 is hoisted to it's parent 316. Sub-rule sets 304 and 306 are hoisted up to their parent 312, producing a new sub-rule set of 3+3=6 rules in node 312. Sub-rule sets 302 and 308 are hoisted up to parent 314 to form a subset of 5+2=7 rules, and sub-rule set 310 is hoisted up to node 318.

The merging continues recursively until all sub-databases have hoisted up as far in the tree as possible. For example, after the first hoisting, sub-rule set 316 comprises two rules. Thus sub-rule set 316 is hoisted to it's parent node 318 which comprises 5 rules from the hoisting of node 310. Therefore, node 318 comprises 7 rules as shown in FIG. 3b from the merging of sub-rule sets 300, and 310. Since 7 is greater than $T_{min}$ and less than or equal to T, no more hoisting is required. Similarly, the 6 rules of node 312 are greater that $T_{min}$ and no more hoisting is required.

Thus, through the foregoing description of Rule Subset Hoisting, the sixteen sub-databases of FIG. 3a have been reduced to thirteen sub-databases. In sum, Rule Subset Hoisting can be described via the following steps:

1) Define $T_{min} \leq T/3$.
2) For all leaves (nodes) with NumberOfRules<$T_{min}$ hoist rules up to their respective parent node.
3) If the parent nodes still do not have $T_{min}$ rules, repeat step 2.

Inserting and Deleting Rules

With a complete understanding of how to create an HST, and how to merge sub-databases within an HST, inserting and deleting rules can easily be understood. When a rule F is added to the plurality of rules of the rule database, a path in the HST is followed, via the appropriate branches given each F(CurrentBit), to the corresponding sub-rule set, and F is added to that sub-rule set. If the addition to the sub-rule set causes the number of rules to exceed T, the sub-rule set is further subdivided as described above until the sub-rule sets have less than or equal to T rules. Merging as described above may then be performed on the sub-rule sets.

When deleting a rule, some sub-rule sets may fall below $T_{min}$ and the merging operation of Rule Subset Hoisting as described above may be performed to increase the minimum number of rules resident in each sub-database.

Thus, algorithms to organize a rule database have been disclosed and illustrated in detail. While specific examples have been given, those skilled in the art will recognize that many variations and adaptation of the current algorithms may be made while still remaining within the scope of the present invention.

Memory Complexity

As already discussed, the All Matching Rules Engine and Best Matching Rules Sub-Engines comprise memories such as CAMs. In the case of the AMRE, the CAM holds a set of Necessary Path Condition Rules. In the case of the BMRSE the CAMs hold sub-databases, wherein the sub-databases comprise sets of rules. Because the CAMs, or any other suitable memory devices, are actual physical device, memory complexity must be considered.

The AMRE holds the Necessary Path Condition Rules and as such must be large enough to hold all of the NPCR. The number of NPCR equals N/$T_{min}$. So for $T_{min}$=T/3, the number of NPCR equals 3N/T. Thus for N=64K, W=256, T=48, the number of NPCR is 4K and the CAM holding the NPCR must have a capacity of 4K*256 bits, or 1Mbit (128 kilobytes).

It is advantageous for the each BMRSE to hold only a single database in a single CAM. This, once again, is because the smaller number of bits searched per packet classification, the lower the average power requirements per classification. Via the hierarchical classification search detailed above, sub-databases comprising only a fraction of the total number of classification rules can quickly be identified for searching via the AMRE. However, due to physical limitations when designing and constructing memories suitable for use in the BMRSE, it more than likely that the such memories will be larger than what is required to hold T number of rules per sub-database. As a consequence, each BMRSE typically holds more than one sub-database. It is therefore advantageous to group the sub-databases residing in the BMRSE such that concurrent activation of more than one BMRSE is minimized.

A presently preferred method of determining the placement of sub-databases within the BMRSE involves a heuristic search combined with a probabilistic search. It should be noted however that while it is advantageous to use these two search methods in combination, either of these methods can be used alone with satisfactory results. Both methods first require the creation of the sub-databases and NPCR.

The heuristic search comprises finding and grouping together all NPCR that could simultaneously match for a given packet header. For example, given a first exemplary NPCR 0X110X1 and 0111XX1 there are two packet headers that match both first NPCR, namely 0111010 and 0111001. Given a second exemplary NPCR 0XX1011 and 0XX1XX1 there are much more than two packet headers that match the second exemplary NPCR. The heuristic search involves basic logic operations, the details of which are well understood by those skilled in the art.

So, the heuristic search groups NPCR that may all match for a particular packet header. However, the probability of a match varies for the NPCR. For example, the probability of a simultaneous match for the second exemplary NPCR above is higher than that for the first exemplary NPCR due to the fact that there are many more packet headers that can match the second NPCR than the first. Thus the probabilistic method is utilized to fine tune how the NPCR, and thus the sub-databases, should be grouped.

The probabilistic method comprises randomly generating valid packet headers, presenting a multiplicity of these packet headers to the AMRE, all along keeping statistics of how often and which sub-rule databases associated with the NPCR are concurrently searched for each packet header. After numerous packets, the statistics reveal that some sub-databases are more likely to need to be concurrently searched than others. The placement of the sub-databases is then done such that those sub-databases more likely to be concurrently searched are stored within the same memory comprising a BMRSE. Additionally, before storing of the sub-databases within the BMRSE the sub-database entries are sorted according to their priority.

Packet header generation devices and associated equipment and methods to monitor said packets, including statistical techniques to analyze the results of classifying said packets, are widely used and well understood by those skilled in the art.

While the disclosed methods still may yield memory placement of sub-databases that cause all BMRSE to be searched for an occasional packet header, this condition is statistically very unlikely. As such, statistically, only a single, or only a very small number of BMRSE need to be searched for an incoming packet and thus, statistically the average power requirements to classify a packet is kept extremely low.

Additional Optimizations, Advantages, and Modifications

Throughout the above discussions, the methods discussed herein were directed to organizing rule databases and the like into data structures optimized for T number of rules per sub-database. In addition to the foregoing methods, additional optimization methods will be discussed below, and these optimization may be applied alone or in conjunction with any of the other methods discussed herein.

Other algorithms may be used in conjunction with those discussed to better optimize the storage consumed by the data structures. For example, Hierarchical Intelligent Cuttings may be applied to the HST structure and sub-databases to further decrease the storage requirements of the system. Via Hierarchical Intelligent Cuttings the storage requirements of each sub-database can be reduced to a number S, wherein S is measured in units of bytes per rule, or equivalent. Furthermore, S may be different for each sub-database. Cross Producting or Recursive Flow Classification may also be used either alone or in combination with each other or Hierarchical Intelligent Cuttings. These and other algorithms suitable for decreasing storage requirements are well understood by those skilled in the art. Hierarchical Intelligent Cuttings, Cross Producting, and Recursive Flow Classifications are discussed in the following papers which are hereby incorporated by reference: "Packet Classification on Multiple Fields," Pankaj Gupta and Nick McKeown, Proc. Sigcomm, Computer Communication Review, vol. 29, no. 4, pp. 147-60, September 1999, Harvard University; "Packet Classification using Hierarchical Intelligent Cuttings," Pankaj Gupta and Nick McKeown, Proc. Hot Interconnects VII, August 99, Stanford University; "Fast and Scalable Layer 4 Switching," V. Srinivasan, G. Varghese, S. Suri and M. Waldvogel, Presented at ACM Sigcomm98.

Yet another optimization that can be implemented in addition to those described is directed to average power dissipation. This method creates an HST structure and sub-database placement such that average power dissipation for the Packet Matching System is kept below a number P, whereby P is measured in units of power such as Watts. For this optimization an HST as described above is created, the sub-databases are placed via the methods above, and the Packet Matching System is tested either by actual use in a network or via the above described packet generation equipment. During testing, average power dissipation, $P_{ave}$, is monitored. If $P_{ave} > P$, the HST is further subdivided or merged to create a new HST, the sub-databases placed, and the matching system tested once again for $P_{ave}$. This process is repeated until $P_{ave} < P$.

Finally, it should be noted that while the HST was subdivided according to bits '0', '1', and 'X', other subdivision criteria may be incorporated with those discussed. For example, selected nodes may be subdivided according to examining groups of bits rather than single bits.

Prefix Matching

The systems and methods described above are easily adapted to work on databases containing entries other than classification rules. For example, a forwarding prefix database, comprising a plurality of next hop addresses given a packet header, can easily be organized via an HST, the equivalent of Necessary Path Condition Rules extracted from the HST, and the forwarding prefix database subdivided into a plurality of forwarding prefix sub-databases. The HST is generated exactly as described above. The equivalent of NPCR and the sub-databases are stored in the AMRE and the BMRSE exactly as described above. Packet headers are input into the AMRE and a search for a best match among the database entries is performed exactly as described above.

Various aspects of the subject-matter described herein are set out non-exhaustively in the following numbered clauses:

1. A Packet Matching method, the method comprising:
   (a) providing a Rule Database comprising a plurality of classification rules, and providing a packet comprising a packet header to be classified;
   (b) creating a plurality of sub-databases from the plurality of classification rules in the Rule Database;
   (c) creating a plurality of Necessary Path Condition Rules wherein each Necessary Path Condition Rule corresponds to a sub-database;
   (d) determining which sub-databases to search, said determining further comprising comparing at least some of the packet header to the plurality of Necessary Path Condition Rules;
   (e) searching the sub-databases determined in step (d) for best matching classification rules; and
   (f) selecting the best matching classification rule.

2. The method of clause 1 wherein the searching in (e) comprises searching in parallel.

3. The method of clause 1 further comprising:
   (g) providing an additional packet to be classified; and
   (h) matching the additional packet according to steps (d), (e) and (f).

4. The method of clause 1 wherein the sub-databases comprise at least T/3 classification rules, and wherein the sub-databases further comprise up to T classification rules.

5. A method for organizing a Rule Database, the method comprising:
   (a) providing a Rule Database comprising a plurality of N classification rules, each classification rule comprising W bits, wherein each bit of the W bits has a value selected from the group consisting of 0, 1, and X;
   (b) constructing a hierarchical subdivision tree, comprising a single root, a plurality of nodes, and a plurality of leaves, wherein the root, the nodes, and the leaves are interconnected by a plurality of branches, wherein each branch corresponds to a value of a bit of the W bits of at least some of the plurality of the N classification rules; and
   (c) creating a plurality of sub-databases such that traversing, via at least some of the branches, any path from the root of the hierarchical subdivision tree through at least some of the interconnected nodes to a leaf of the plurality of leaves will lead to a sub-database, wherein each sub-database comprises a subset of up to T classification rules of the plurality of N classification rules, and wherein each of the plurality of the N classification rules is a member of exactly one sub-database.

6. The method of clause 5 wherein each sub-database further comprises a subset of at least $T_{min}$ classification rules of the plurality of N classification rules.

7. The method of clause 6 wherein $T_{min}$ is less than or equal to T/3.

8. The method of clauses 5, 6, or 7 further comprising creating a plurality of Necessary Path Condition Rules wherein each of the Necessary Path Condition Rules corresponds to a sub-database, and wherein each of the Necessary Path Condition Rules of the plurality of the Necessary Path Condition Rules is comprised of the bit values associated with each traversed branch of the hierarchical subdivision tree while traversing the hierarchical subdivision tree from the root to the corresponding exactly one sub-database.

9. The method of clause 5 wherein N is at least around 10,000.

10. The method of clause 5 wherein W is at least around 32.

11. The method of clause 5 further comprising inserting an additional rule to a sub-database.

12. The method of clause 5 further comprising deleting an existing rule from a sub-database.

13. A Packet Matching system, the system comprising:
   an All Matching Rules Engine capable of receiving a packet header;
   a plurality of Best Matching Rules Sub-Engines coupled to said All Matching Rules Engine; and
   a Collate Engine coupled to said Best Matching Rules sub-Engines.

14. The system of clause 13 wherein said All Matching Rules Engine further comprises a memory comprising a set of Necessary Path Condition Rules.

15. The system of clause 14 wherein said memory comprises at least one of the following memories: CAM, DRAM, SRAM.

16. The system of clause 14 wherein each of the plurality of said Best Matching Rules sub-Engines further comprises a memory, said memory comprising at least one sub-database, each said at least one sub-database corresponding to said Necessary Path Condition Rules.

17. The system of clause 16 wherein said memory comprises at least one of the following memories: CAM, DRAM, SRAM.

18. The system of clause 16 wherein said at least one sub-database comprises a plurality of rules.

19. The system of clause 16 wherein said at least one sub-database comprises a plurality of forwarding entries.

20. The system of clause 14 wherein said plurality of Best Matching Rules sub-Engines further comprises a plurality of sub-databases, wherein each sub-database of said plurality of sub-databases corresponds to one of said Necessary Path Condition Rules, wherein said plurality of sub-databases are distributed among said plurality of Best Matching Rules sub-Engines such that concurrent activation of more than one Best Matching Rules sub-Engine of said plurality of sub-Engines is minimized.

21. A Packet Matching system comprising:
   means for creating a plurality of sub-databases from a plurality of rules;
   means for determining which sub-databases to search given a packet;
   means for finding best rule matches among the determined sub-databases for the packet; and
   means for selecting the highest priority best matching rule from among the found best rule matches.

22. The system of clause 21 wherein said means for creating further comprises an optimizing means for creating the plurality of sub-databases such that power dissipation is less than P.

23. The system of clause 21 wherein said means for creating further comprises an optimizing means for creating the plurality of sub-databases such that storage requirements of each sub-database of the plurality of sub-databases is less than S.

CONCLUSION

The foregoing detailed description has discussed only a few of the many forms that this invention can take. For this reason, the detailed description is intended by way of illustration and not limitation. It is only the following claims, including all equivalents, that are intended to define the scope of this invention.

The invention claimed is:

1. A method of constructing a hierarchical database from an initial plurality of rules, wherein the hierarchical database is provided within a memory device, the method comprising:
   adding a first rule of the initial plurality of rules to a first sub-database in the memory device if a first bit of the rule is a logic '0' value;
   adding the first rule to a second sub-database in the memory device if the first bit is a logic '1' value;
   adding the first rule to a third sub-database in the memory device if the first bit is in a masked state, 'X', indicating that the first bit may be either a logic '1' or a logic '0' value; and
   adding each other rule of the initial plurality of rules to either the first sub-database, the second sub-database or the third sub-database, according to a first bit of the other rule, wherein the first sub-database, second sub-database and third sub-database form a first hierarchical level in the hierarchical database and wherein the method further comprises:
   after adding the first rule and each other rule of the initial plurality of rules to either the first sub-database, the second sub-database or the third sub-database, splitting the first sub-database into a second hierarchical level of sub-databases if, before splitting the first sub-database, the first sub-database contains more than a predetermined number of rules, wherein the constructed hierarchical database is configured to search a packet header for one or more matching rules.

2. The method of claim 1 wherein splitting the first sub-database into a second hierarchical level of sub-databases comprises adding a first rule of the plurality of rules within the first sub-database to:
   a fourth sub-database if a second bit of the rule is a logic '0' value;
   a fifth sub-database if the second bit of the rule is a logic '1' value; and
   a sixth sub-database if the second bit of the rule is in the masked state, 'X'.

3. The method of claim 2 further comprising splitting the second sub-database into a corresponding second hierarchical level of sub-databases if the second sub-database comprises more than the predetermined number of rules, and splitting the third sub-database into a corresponding second hierarchical level of sub-databases if the third sub-database comprises more than the predetermined number of rules.

4. The method of claim 3 further comprising repeatedly splitting each sub-database at the second or lower hierarchical level into respective sub-databases at an even lower hierarchical level until all the sub-databases have no more than the predetermined number of rules.

5. The method of claim 4 wherein each rule appears in no more than one of the sub-databases.

6. The method of claim 4 further comprising merging a sub-database at the second or lower hierarchical level into a respective sub-database at a higher hierarchical level if the sub-database has fewer than a minimum number of rules.

7. The method of claim 6 wherein the minimum number of rules is one-third the predetermined number of rules.

8. The method of claim 3 wherein splitting sub-databases at each hierarchical level comprises splitting the sub-databases based on a logical value of a bit at a bit position different than bit positions evaluated at higher hierarchical levels.

9. A method of searching a hierarchical database for a best matching classification rule to route a received packet across a network, wherein the hierarchical database is provided within a memory device, the method comprising:
selectively searching a first set of sub-databases in the memory device if a first bit of the received packet header is a logic '0' value;
selectively searching a second set of sub-databases in the memory device if the first bit is a logic '1' value;
selectively searching a third set of sub-databases in the memory device if the first bit is in a masked state, 'X', indicating that the first bit may be either a logic '1' or a logic '0' value; and
selectively searching one of the first, second and third sets of sub-databases by selectively searching a subset of the respective set of sub-databases based on one or more other bits of the packet header for the best matching classification rule, wherein selectively searching a subset of the respective set of sub-databases comprises:
selectively searching a first subset of the set of sub-databases if a second bit of the packet header is a logic '0' value;
selectively searching a second subset of the set of sub-databases if the second bit is a logic '1' value; and
selectively searching a third subset of the set of sub-databases if the second bit is in a masked state, 'X'.

10. The method of claim 9 wherein selectively searching a subset of the respective set of sub-databases comprises searching a first sub-database of the respective set of sub-databases based on a ternary match of the bits of the packet header.

11. An apparatus comprising:
an interface to receive a plurality of rules; and
circuitry to organize the plurality of rules into a hierarchical database of rules, wherein the hierarchical database is stored in a memory device, and wherein the circuitry includes circuitry to store a first rule of the plurality of rules in either a first sub-database, a second sub-database, or a third sub-database according to whether a first bit of the first rule is a logic '0' value, a logic '1' value or in a masked state, 'X', respectively, the masked state indicating that the first bit may be either a logic '1' or a logic '0' value and wherein the circuitry is further configured to store the first rule in either a fourth sub-database, a fifth sub-database, or a sixth sub-database according to whether a second bit of the first rule is a logic '0' value, a logic '1' value or in a masked state, 'X', respectively.

12. The apparatus of claim 11 wherein the first, second and third sub-databases form a first hierarchical level of the hierarchical database.

13. The apparatus of claim 11 wherein each of the first, second and third sub-databases can store at most, a predetermined number of rules.

14. The apparatus of claim 11 wherein the fourth, fifth and sixth sub-databases form a second hierarchical level of the hierarchical database.

15. An apparatus comprising:
means for adding a first rule of an initial plurality of rules to a first sub-database of a hierarchical database if a first bit of the rule is a logic '0' value, wherein the hierarchical database is stored in a memory device;
means for adding the first rule of the initial plurality of rules to a second sub-database of the hierarchical database if the first bit is a logic '1' value;
means for adding the first rule to a third sub-database of the hierarchical database if the first bit is in a masked state, 'X', indicating that the first bit may be either a logic '1' or a logic '0' value; and
means for adding each other rule of the initial plurality of rules to either the first sub-database, the second sub-database or the third sub-database, according to a first bit of the other rule, wherein the first sub-database, second sub-database and third sub-database form a first hierarchical level in the hierarchical database and wherein the method further comprises:
after adding the first rule and each other rule of the initial plurality of rules to either the first sub-database, the second sub-database or the third sub-database, means for splitting the first sub-database into a second hierarchical level of sub-databases if, before splitting the first sub-database, the first sub-database contains more than a predetermined number of rules.

* * * * *